US011173384B2

(12) United States Patent
Saunders

(10) Patent No.: US 11,173,384 B2
(45) Date of Patent: Nov. 16, 2021

(54) TOKEN SORTING APPARATUS

(71) Applicant: TCS John Huxley Europe Limited, Stoke-On-Trent (GB)

(72) Inventor: Andrew Michael Saunders, London (GB)

(73) Assignee: TCS John Huxley Europe Limited, Stoke-On-Trent (GB)

( * ) Notice: Subject to any disclaimer, the term of this patent is extended or adjusted under 35 U.S.C. 154(b) by 0 days.

(21) Appl. No.: 16/963,470

(22) PCT Filed: Jan. 31, 2019

(86) PCT No.: PCT/GB2019/050280
§ 371 (c)(1),
(2) Date: Jul. 20, 2020

(87) PCT Pub. No.: WO2019/155188
PCT Pub. Date: Aug. 15, 2019

(65) Prior Publication Data
US 2020/0360798 A1    Nov. 19, 2020

(30) Foreign Application Priority Data

Feb. 6, 2018   (GB) ..................................... 1801917

(51) Int. Cl.
*A63F 5/00* (2006.01)
*A63F 3/00* (2006.01)
(Continued)

(52) U.S. Cl.
CPC ........... *A63F 3/00157* (2013.01); *G07D 3/14* (2013.01); *A63F 5/00* (2013.01); *A63F 5/0005* (2013.01);
(Continued)

(58) Field of Classification Search
CPC ........ A63F 2003/00164; A63F 3/00157; A63F 5/00; A63F 5/0005; A63F 2011/0006; A63F 2009/2435
(Continued)

(56) References Cited

U.S. PATENT DOCUMENTS 4,157,139 A * 6/1979 Bjork ........................ B07C 5/36
                                          198/397.05
6,283,856 B1 * 9/2001 Mothwurf ............... G07F 17/32
                                          273/138.2
(Continued)

FOREIGN PATENT DOCUMENTS

| GB | 2333632 A | 7/1999 |
|---|---|---|
| WO | 2001051142 A1 | 7/2001 |
| WO | 2004009256 A1 | 1/2004 |

OTHER PUBLICATIONS

International Search Report and Written Opinion dated Apr. 4, 2019 from counterpart International Application No. PCT/GB2019/050280, 11 pp.
(Continued)

*Primary Examiner* — Benjamin Layno
(74) *Attorney, Agent, or Firm* — Shumaker & Sieffert, P.A.

(57) ABSTRACT

A token sorting apparatus is arranged to supplement a game using gaming tokens, the game having a plurality of stages. The sorting apparatus includes an entry aperture arranged to accept gaming tokens; a sorting mechanism arranged to sort gaming tokens according to a predetermined characteristic of the gaming tokens; a displacement member arranged to urge gaming tokens accepted by the entry aperture to the sorting mechanism; a camera arranged to obtain an image of the sorting mechanism and the displacement member; a display member in digital communication with the camera, the display member arranged to display the image to a user;
(Continued)

Figure 1:
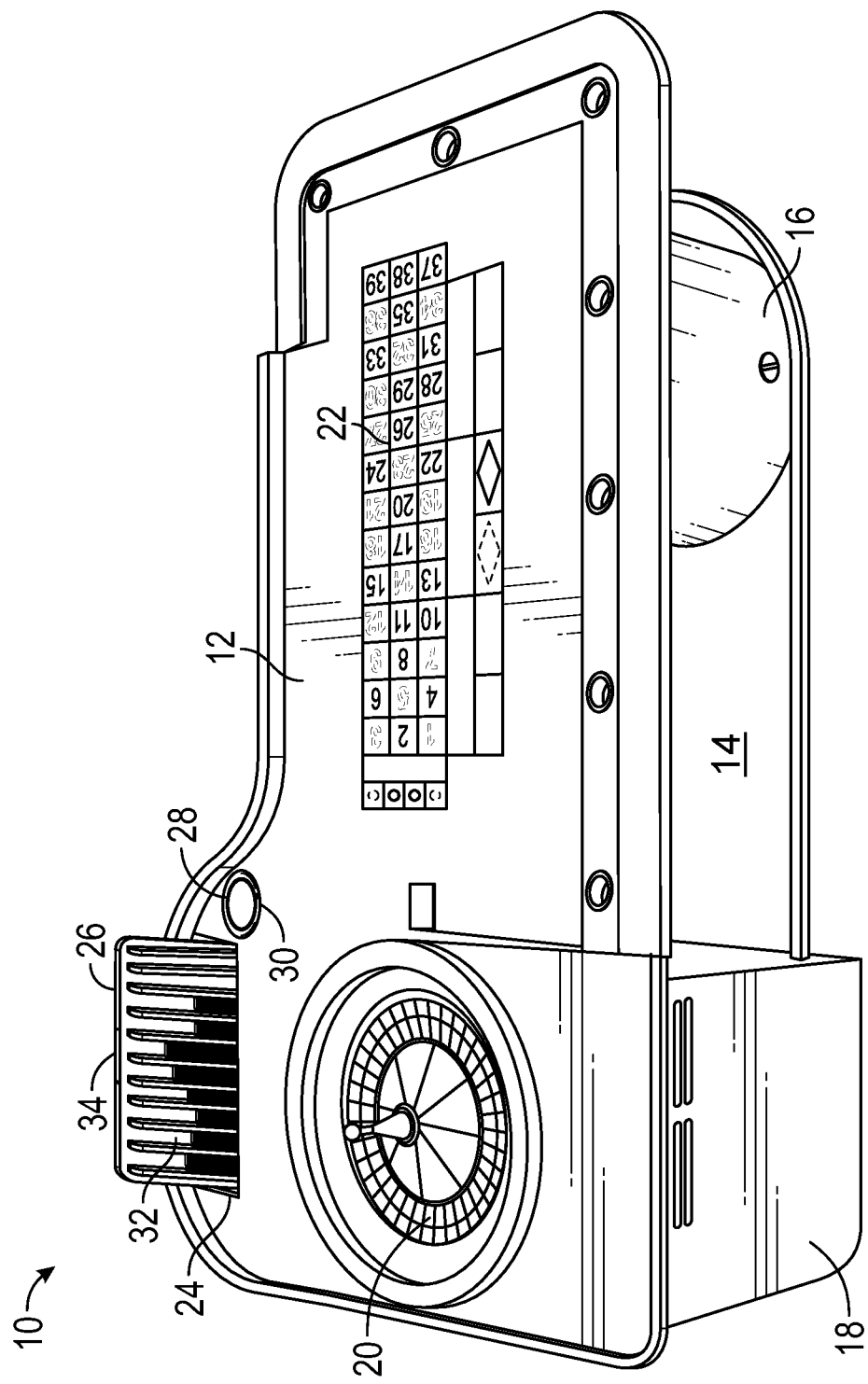

and a signaling member arranged to provide a signal to the user, the signal being arranged to indicate a stage of the game or a status of the game.

19 Claims, 5 Drawing Sheets

(51) Int. Cl.
 *G07D 3/14* (2006.01)
 *A63F 9/24* (2006.01)
 *A63F 11/00* (2006.01)
 *G06F 7/58* (2006.01)
 *G07D 3/16* (2006.01)

(52) U.S. Cl.
 CPC ............... *A63F 2003/00164* (2013.01); *A63F 2009/2435* (2013.01); *A63F 2011/0006* (2013.01); *G06F 7/588* (2013.01); *G07D 3/16* (2013.01)

(58) Field of Classification Search
 USPC ..... 273/292, 309, 148 R, 142 E; 463/17, 25, 463/26, 42, 46, 292, 309, 148 R, 142 E
 See application file for complete search history.

(56) References Cited

U.S. PATENT DOCUMENTS 6,772,870 B2 8/2004 Sugai et al.
2009/0291762 A1* 11/2009 Walker ................ G07F 17/3241
 463/42

OTHER PUBLICATIONS

International Preliminary Report on Patentability dated Aug. 20, 2020 from counterpart International Application No. PCT/GB2019/050280, 7 pp.

* cited by examiner

TOKEN SORTING APPARATUS

This application is a national stage application under 35 U.S.C. § 371 of PCT Application No. PCT/GB2019/050280, filed Jan. 31, 2019, which claims the benefit of Great Britain Application No. 1801917.4, filed Feb. 6, 2018. The entire contents of each of PCT Application No. PCT/GB2019/050280 and Great Britain Application No. 1801917.4 are incorporated herein by reference in their entireties.

FIELD OF THE INVENTION

The present invention relates to gaming apparatuses, in particular to gaming apparatuses for use in casinos.

BACKGROUND TO THE INVENTION

Currency transferred and used at casinos can take a number of different forms depending upon the game being played. For many games the currency takes the form of a gaming token such as a gaming chip.

In games such as roulette, gaming chips have been used for a number of years. In early examples of gaming chip use, multiple staff members might be used per roulette table, when busy. These staff members would share the responsibilities for dealing the game, placing bets, watching the layout to ensure compliance with regulations, placing the dolly on the winning number, and finally clearing the layout. Invariably, another dealer at the table would have the sole responsibility for sorting the gaming chips back into single colours and stack them into predetermined quantities. With multiple shifts in one gaming day and cover during breaks, the amount of staff to cover a single roulette table was suboptimal.

Chip sorting machines have been introduced in most venues in order to reduce the number of staff per table, which has also increased the speed with which used chips are recycled, sorted and dealt, but these current sorting machines still suffer a number of disadvantages.

Regular stopping and checking of the machines for obstructions poses a security risk and extends maintenance time and therefore the time the machines are inactive. While speed of sorting has been increased, there is still room for improvement in optimising performance and play time in order to maximise the number of games in a given period of time. Maximising the number of games in a given time period offers more opportunity for reward to players and increases player excitement and an improved overall consumer experience. Current machines are not at present used to maximum effect in supplementing the playing of a game which they accompany.

It is therefore desirable to provide an apparatus that can be used to provide supplementary functionality to a gaming apparatus, the supplementary functionality enabling the more effective operation of the gaming apparatus.

SUMMARY OF THE INVENTION

In accordance with a first aspect of the present invention there is provided a token sorting apparatus arranged to supplement a game using gaming tokens, the game having a plurality of stages, the sorting apparatus comprising: an entry aperture arranged to accept gaming tokens; a sorting mechanism arranged to sort gaming tokens according to a predetermined characteristic of the gaming tokens; a displacement member arranged to urge gaming tokens accepted by the entry aperture to the sorting mechanism; a camera arranged to obtain an image of the sorting mechanism and the displacement member; a display member in digital communication with the camera, the display member arranged to display the image to a user; and a signalling member arranged to provide a signal to the user, the signal being arranged to indicate a stage of the game or a status of the game.

In the context of the present invention, the term "gaming" will be understood by the skilled addressee to mean "gambling".

A token sorting apparatus according to the first aspect of the present invention is preferably used to supplement a game using gaming tokens by sorting gaming tokens accepted by the entry aperture. The game preferably comprises a plurality of stages. A stage in the game may preferably correspond to a requirement from a user, the requirement determining the provision of gaming tokens to the entry aperture of the token sorting apparatus by the user. Preferably the user is a croupier or dealer of a game.

The token sorting apparatus comprises a signalling member arranged to provide a signal to a user, the signal indicating a stage of the game, and thus preferably indicating to the user the requirement for provision of gaming tokens to the entry aperture of the token sorting apparatus. The signalling member preferably provides a prompt to the user, and more preferably enables optimisation of play of the game.

In an embodiment, it might be preferable to increase the speed with which the game is played, in order to maximise the number of plays in a particular time period, thereby offering a player a greater number of opportunities for a reward. The signalling member preferably increases the speed with which the user provides the gaming tokens to the entry aperture of the token sorting apparatus.

In further embodiments, it might be preferable to increase the accuracy of the user in providing the correct gaming tokens to the entry aperture during the correct game stage. The signalling member preferably increases the accuracy with which the user provides the correct gaming tokens to the entry aperture of the token sorting apparatus during a stage of the game.

Preferably the signal is further arranged to indicate a status of the token sorting apparatus.

The token sorting apparatus of the present invention is preferably used to support data collection, the data relating to characteristics of the game being played. The characteristics of the game being played might preferably include the number of gaming tokens accepted by the entry aperture during a game stage, and/or the characteristics of said accepted gaming tokens. The token sorting apparatus preferably comprises a sensor arranged to detect data characteristic of gaming tokens accepted by the entry aperture during a game stage. Preferably the data comprises the number of gaming tokens accepted by the entry aperture during a game stage. Preferably the data comprises a predetermined characteristic of the gaming tokens. The token sorting apparatus more preferably comprises a memory arranged to store the data obtained by the sensor. The token sorting apparatus more preferably comprises a processor arranged to process the stored data. The token sorting apparatus most preferably comprises a transmitter arranged to transmit the stored data and/or the processed data. Preferably the data is used to provide more accurate information about play of the game, which might preferably include a statistical analysis, which may preferably be used to inform a play optimisation approach. A play optimisation approach in the context of the present invention might include increasing the speed and/or accuracy with which the game is played.

Preferably the entry aperture is arranged to accept a plurality of gaming tokens at one time and is more preferably shaped to provide maximum ease of entry of a plurality of gaming tokens at one time. More preferably the entry aperture is substantially circular, and most preferably the entry aperture is comprised within a funnel. The token sorting apparatus is further arranged to sort gaming tokens accepted by the entry aperture using the sorting mechanism. A displacement member is arranged to urge gaming tokens accepted by the entry aperture to the sorting mechanism.

Preferably the sorting mechanism comprises at least one sensor arranged to detect the predetermined characteristic of the gaming tokens. More preferably the sorting mechanism comprises a stacking member arranged to sort the gaming tokens into at least one stack according to the predetermined characteristic, preferably providing at least one stack of sorted tokens. More preferably the sorting mechanism comprises at least one channel arranged to present the at least one stack of sorted tokens to a user. The at least one stack of sorted tokens are preferably arranged in groups according to a predetermined quantity. The predetermined quantity is preferably a standard quantity of tokens taken by a user at a given stage in a game.

Routine maintenance of currently available token sorting apparatuses can usually include opening and clearing the token sorting apparatus at the end of every period of continued operation. The purpose of such opening and clearing of the token sorting apparatus might be to clear potential obstructions and to facilitate extended operation of the token sorting apparatus. In the first aspect of the present invention, viewing the display member arranged to display the image of the sorting mechanism and the displacement member preferably enables a user to identify the presence or absence of any potential obstructions and therefore avoid unnecessary opening and clearing of the sorting apparatus, along with any associated down-time. A user might therefore choose to keep the token sorting apparatus closed and in use if no potential obstruction is identified by viewing the display member.

Preferably the display member comprises a touch-sensitive screen and is further arranged to permit input of instructions from a user by touching the touch-sensitive screen. Input of instructions might preferably be used to access information stored on an internal memory within the token sorting apparatus, the stored information preferably comprising information about the game; prompts to a user to be displayed on the display member; data characteristic of gaming tokens accepted by the entry aperture during a game stage; and/or data characteristic of the start time, end or duration or a game or game stage. The display member preferably comprises a graphical user interface, preferably enabling easy navigation of on-board software and input of instructions to the token sorting apparatus. Preferably the display member comprises a screen arranged to play video.

The camera is preferably arranged to provide an image of the interior of the token sorting apparatus. More preferably, the camera has an orientation defining the direction from which the camera obtains the image. Still more preferably the orientation of the camera may be adjusted. Still more preferably the adjustment of the orientation of the camera may be performed by a user through the action of providing appropriate input instructions to the touch-sensitive screen, which is preferably comprised within the display member. Most preferably the orientation of the camera may be adjusted to provide a user with the ability to interrogate the token sorting apparatus. The interrogation of the token sorting apparatus preferably reduces the time taken for regular maintenance of the token sorting apparatus and preferably reduces associated down-time and labour time.

Preferably the signalling member comprises at least one illumination member. More preferably the signal comprises a display of illumination. Still more preferably the display of illumination comprises a sequence of illumination. Most preferably the display of illumination is arranged to be customised according to a predetermined list of game stages.

Preferably the signalling member is arranged to provide a countdown to a game stage.

Preferably, the sensor is arranged to detect a malfunction of the token sorting apparatus and/or a physical random number generator. More preferably, the signalling member is arranged to provide a signal to a user indicating malfunction.

Preferably the signalling member is located about the circumference of said entry aperture.

In a preferred embodiment the entry aperture is comprised within a funnel having a signalling member comprising an illumination member located about the rim of the funnel. More preferably the illumination member comprises an array of LEDs arranged to display a plurality of colours, hues, shades and variations. Still more preferably the illumination member is arranged to be programmed to display said plurality of colours, hues, shades and variations. Still more preferably the illumination member is arranged to be programmed to provide illumination of all, some or none of the illumination member, which may preferably be provided either at one time, or in a sequential manner over a period of time, for example, during a period of a game.

Preferably said gaming tokens comprise gaming chips.

Preferably said predetermined characteristic comprises one selected from the range: colour; opacity; size; shape; density; mass; weight; indentation; engraving; embossment; surface marking; surface number; surface image; surface indicia; surface pattern; data value stored on the token.

Preferably the token sorting apparatus further comprises at least one channel arranged to present sorted tokens to the user. More preferably the token sorting apparatus comprises a plurality of channels arranged to present sorted tokens to the user. More preferably the sorting mechanism is arranged to stack sorted tokens along said channels. Most preferably the sorting mechanism is arranged to stack the tokens along said channels by inserting tokens from the bottom of said stacks.

Preferably the token sorting apparatus further comprises at least one sensor arranged to obtain first operation data relating to the operation of the sorting apparatus. More preferably the token sorting apparatus is arranged to record and store the first operation data from the at least one sensor. Still more preferably the first operation data comprises at least one selected from the range: a sum of gaming tokens; duration of a game; duration of a game stage; malfunction of the token sorting apparatus.

In a preferable embodiment, the first operation data may be received and processed by a processor. More preferably the processor may control the signalling member according to the first operation data received by the processor.

Preferably the token sorting apparatus is arranged to communicate the stored first operation data to a server.

Preferably the token sorting apparatus is arranged to communicate with at least one physical random number generator, the physical random number generator being used to play the game. More preferably the physical random number generator comprises at least one physical random number generator sensor arranged to detect second operation data, the second operation data relating to the operation of the random number generator. Still more preferably the token sorting apparatus is further arranged to receive the second operation data from the physical random number generator sensor. Still more preferably the token sorting apparatus is arranged to record and store the second operation data.

Preferably the second operation data comprises at least one selected from the range: start of a game; end of a game; duration of a game; start of a game stage; end of a game stage; duration of a game stage; the result of a game; zone bias; number bias; result bias; physical orientation of the physical random number generator. More preferably the second operation data can be received by a processor comprised within the token sorting apparatus. More preferably the processor can control the signalling member according to the second operation data information received.

Preferably the physical random number generator is a roulette wheel. More preferably the roulette wheel is automated. More preferably the roulette wheel comprises a bowl having a rim along which a ball is arranged to travel, before losing momentum and dropping from a location about the rim and landing in a pocket of the roulette wheel located within the bowl, the pocket having a number and a colour. In embodiments wherein the physical random number generator is a roulette wheel, the second operation data comprises at least one selected from the range: result of the roulette game; the pocket of the roulette wheel where the ball landed; the colour of the pocket; the number of the pocket; the location of the rim from which the ball dropped; the speed of the ball taken from at least one point about the rim; drop zone bias; pocket bias; pocket frequency; physical orientation of the roulette wheel.

Preferably the display member is arranged to display the first operation data and/or the second operation data.

Preferably the token sorting apparatus is arranged to receive information from a server. More preferably, the information received from a server comprises information relating to the operation of a casino. Still more preferably the information relating to the operation of a casino may comprise an indication of when a player requests or begins to play the game; a casino wide notification; an indication of when the game is to finish; an indication of when operation of the token sorting apparatus is due to cease. More preferably the information received from a server can be processed by a processor comprised with the token sorting apparatus. Most preferably the information received from the server can be used by the processor to control the signalling member. In a preferable embodiment, a server located within a casino can be used to provide information relating to the operation of the casino to the processor of the token sorting apparatus. In the preferable embodiment, the processor is arranged to control the signalling member according to the information received. In the preferable embodiment the controlling of the signalling member is used to alert the user of the token sorting apparatus to the information received.

In accordance with a second aspect of the present invention there is provided a token sorting apparatus arranged to supplement a game using gaming tokens, the game having a plurality of stages, the sorting apparatus comprising: an entry aperture arranged to accept gaming tokens; a sorting mechanism arranged to sort gaming tokens according to a predetermined characteristic of the gaming tokens; a displacement member arranged to urge gaming tokens accepted by the entry aperture to the sorting mechanism; and a signalling member arranged to provide a signal to the user, the signal being arranged to indicate a stage of the game or a status of the game.

Preferably the token sorting apparatus further comprises a camera arranged to obtain an image of the sorting mechanism and the displacement member. More preferably the token sorting apparatus further comprises a display member in digital communication with the camera, the display member arranged to display the image to a user.

DETAILED DESCRIPTION

Figure 2:
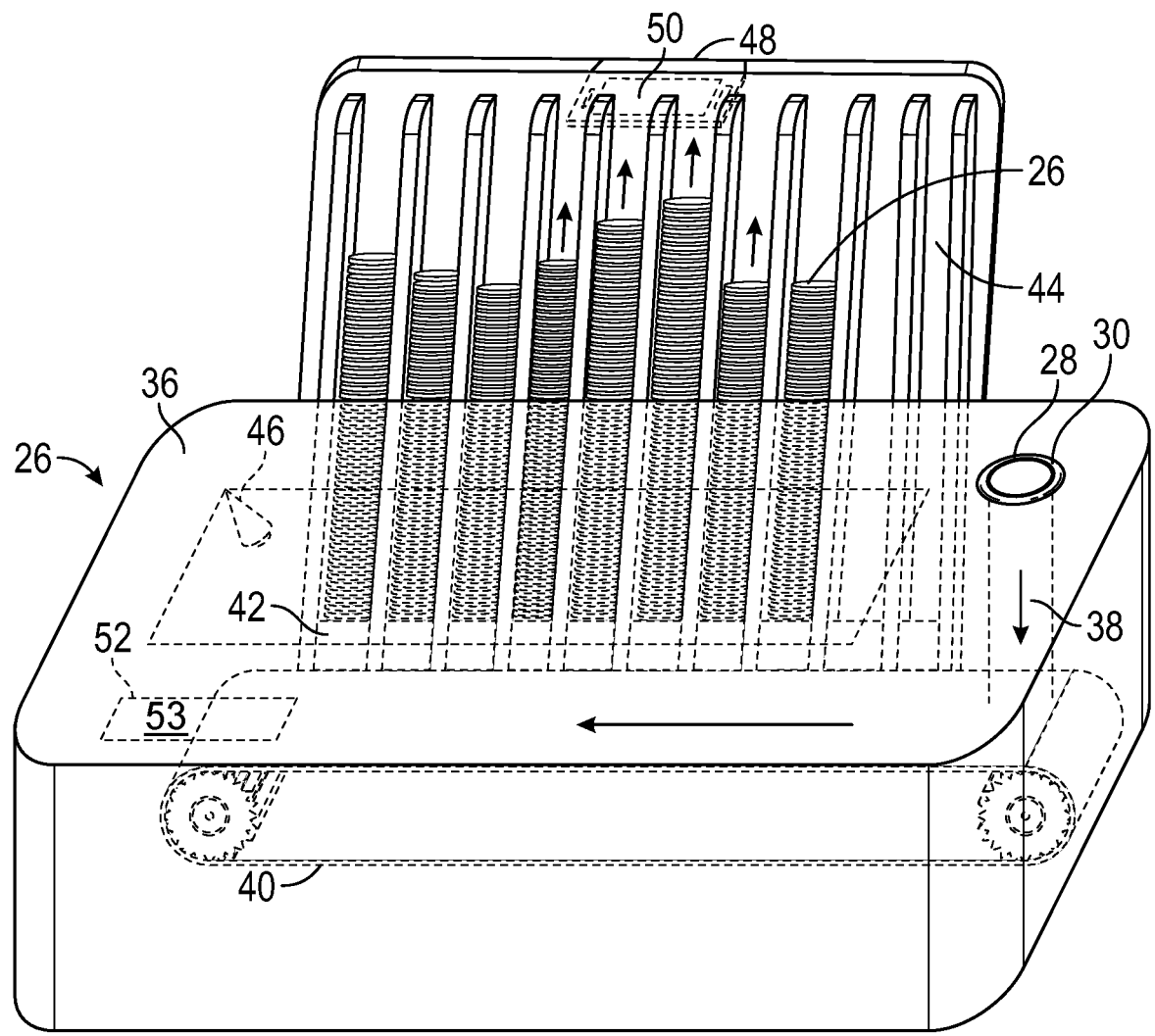
Figure 3A:
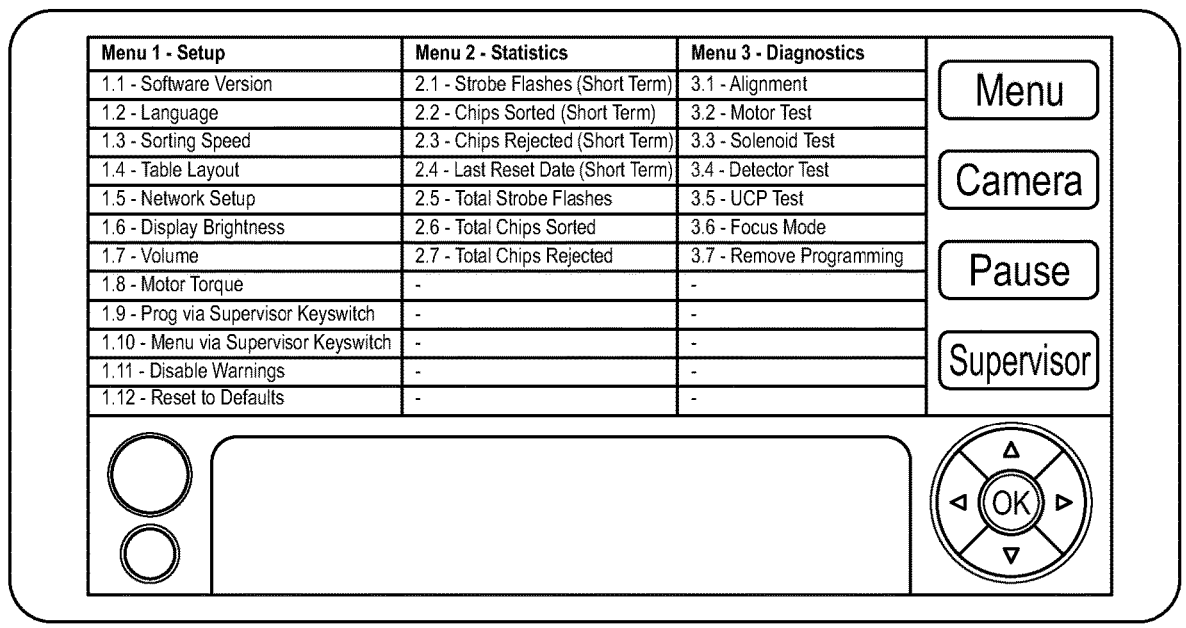
Figure 3B:
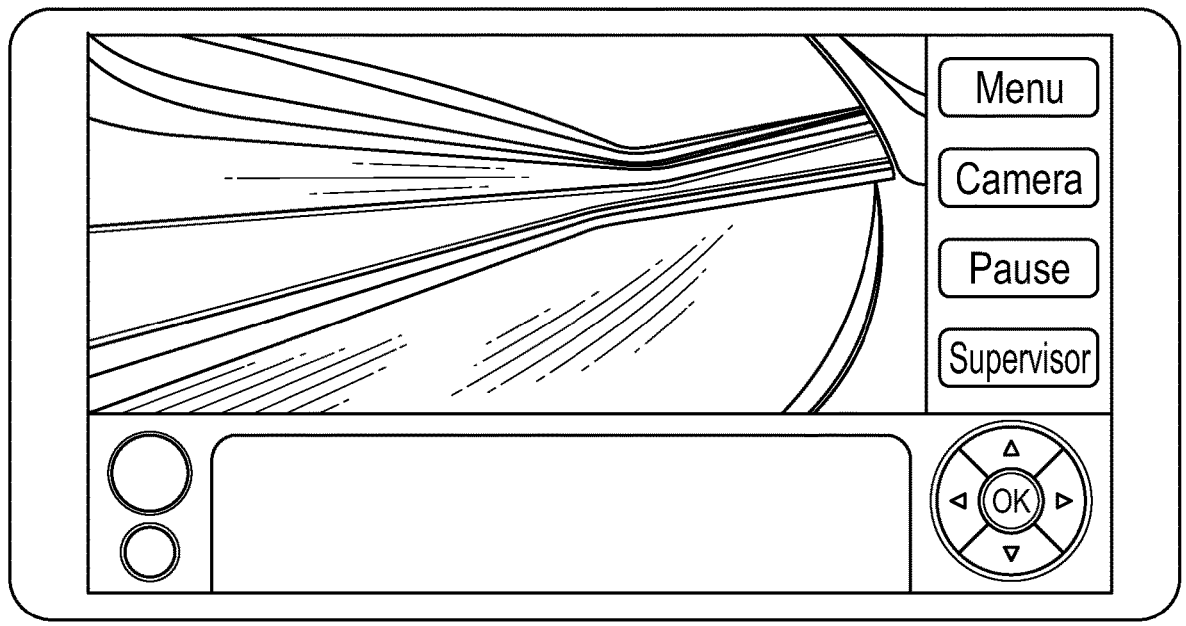
Figure 4A:
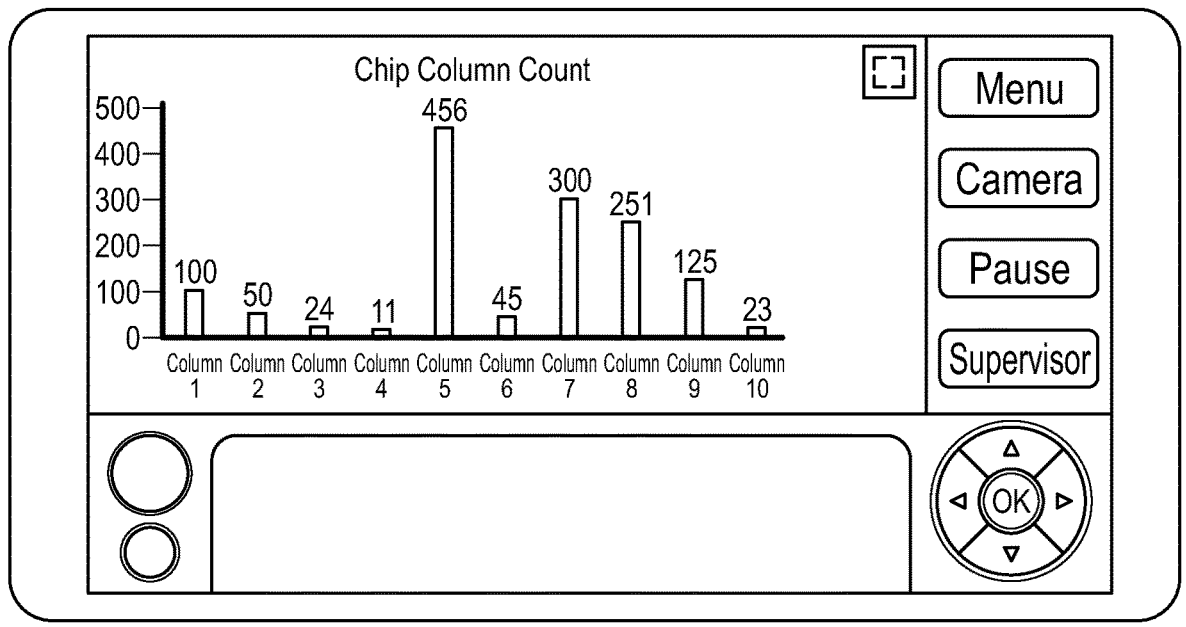
Figure 4B:
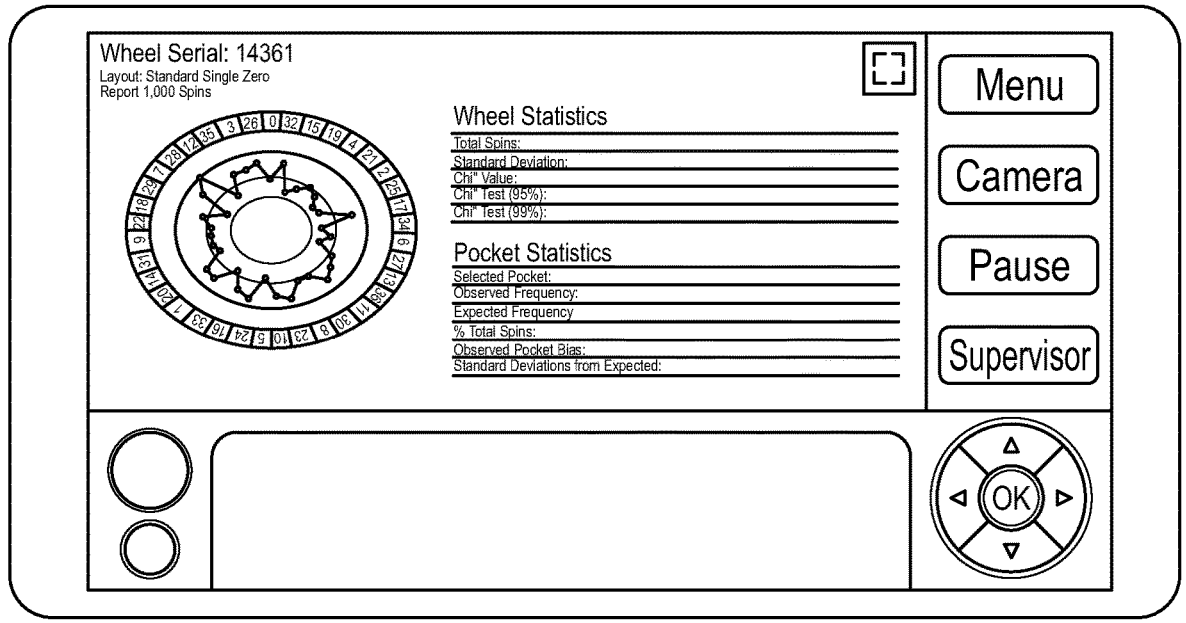
Figure 5:
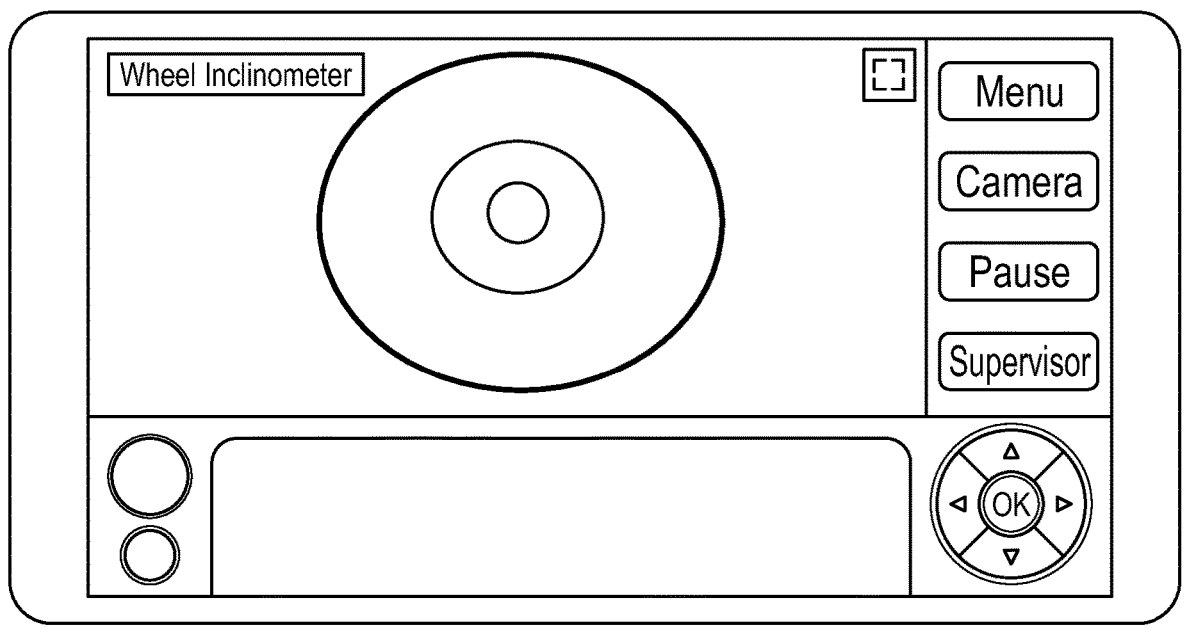

Specific embodiments will now be described by way of example only, and with reference to the accompanying drawings, in which:

FIG. 1 provides an isometric view of a gaming table comprising a token sorting apparatus according to the present invention;

FIG. 2 provides a sectional view of a token sorting apparatus according to the first aspect of the present invention and shown in FIG. 1;

FIG. 3A and FIG. 3B provide example views of a display member according to the first aspect of the present invention and shown in FIG. 1 and FIG. 2;

FIG. 4A and FIG. 4B provide additional example views of a display member according to the first aspect of the present invention and shown in FIG. 1 and FIG. 2; and FIG. 5 provides an additional example view of a display member according to the first aspect of the present invention and shown in FIG. 1 and FIG. 2.

Referring to FIG. 1, a gaming table 10 is shown comprising a substantially rectangular, planar upper surface 12 having a horizontal orientation and being supported on a stand 14 having a first stand portion 16 located at a first end of the substantially rectangular upper surface 12, and a second stand portion 18 located at a second end of the substantially rectangular upper surface 12. An automated roulette wheel 20 is incorporated into the second stand portion 18, the automated roulette wheel 20 being positioned so as to be visible from any point about the periphery of the upper surface 12.

A portion of the upper surface 12 supported by the first stand portion 16 comprises a betting portion 22, identified by the presence of indicia detailing the available betting options for a game of roulette. A cutaway portion 24 of the upper surface 12 is located proximate the automated roulette wheel 20, the cutaway portion arranged to accommodate a token sorting apparatus 26 according to the present invention, the token sorting apparatus 26 comprising an entry aperture 28.

The entry aperture 28 is accommodated within an aperture of the upper surface 12 and is substantially circular, having a rim defining a signalling member 30, the signalling member 30 located about the periphery of the entry aperture 28, and comprising an illumination member comprising LEDs. The token sorting apparatus 26 further comprises a displacement member (not shown) arranged to urge tokens received by the entry aperture 28 to a sorting mechanism 32 defining a plurality of channels inclined away from the upper surface 12 and sized to accommodate stacks of sorted disc-shaped gaming tokens, said tokens sorted into said stacks by the token sorting apparatus, according to a predetermined characteristic of said tokens.

A display member 34 is located on a surface of the token sorting apparatus substantially opposed to the inclined channels, the display member 34 comprising a rectangular touch-sensitive screen arranged to be viewed by a user of the token sorting apparatus.

The stages of a roulette game might include a betting period, during which players are permitted to place bets according to the available betting options outlined by the betting portion of the gaming table. The betting period might be followed by a "no more bets" period, during which players are no longer permitted to place bets. Following the "no more bets" period, or alternatively a component of the "no more bets period", might be an exit period, during which the gaming table is reset and winners are rewarded. Additional embodiments will be apparent wherein there are additional stages to a game of roulette.

In use, the signalling member is arranged to provide a display of illumination specific to each stage of the roulette game. This is to indicate the game stage to the croupier, a dealer, a supervisor and/or security staff to observe the game stage. Benefits to this include improved timing and accuracy from a croupier or dealer, along with improved security.

Referring to FIG. 2, a sectional view of an example embodiment of a token sorting apparatus 26 is provided according to the present invention. The token sorting apparatus comprises a substantially cuboidal base 36 having an upper surface supporting an entry aperture 28. The entry aperture 28 provides a route of entry into an internal cavity 38 of the base 36, the cavity accommodating a displacement member 40, arranged to urge gaming tokens accepted by the entry aperture 28 to a sorting mechanism 42 arranged to sort the gaming tokens according to a predetermined characteristic of the gaming tokens. The sorting mechanism 42 comprises a plurality of vertically inclined channels 44, wherein the sorting mechanism 42 is arranged to accommodate stacks of sorted gaming tokens 26. A camera 46 is positioned in an upper corner of the cavity 38, and oriented to image the displacement member 40. At the apex of the inclined channels 44 is positioned a display member 48, having a touch-sensitive screen 50 declined from the apex of the inclined channels 44 and facing away from the token sorting apparatus 26. The token sorting apparatus further comprises a plurality of sensors (not shown) arranged to detect operation data relating to the use of the apparatus, including the number of tokens accepted by the entry aperture 28 during a particular time period. The token sorting apparatus further comprises a processor 52 and a memory 53 arranged to process and store the operation data obtained by the sensors. The processor 52, memory 53, camera 46, display member 48, sensors (not shown) and signalling member 30 are all arranged to be in digital communication with one another.

The sorting mechanism elements of the sorting apparatus can be as described in, for example, GB2333632A, and in which, the displacement member 40 comprises a conveyor 40 (labelled with like numeral 40 for ease of discussion of sorting mechanism) having recesses (not shown) arranged to accept gaming tokens 26 dropping from the entry aperture 28. An agitation mechanism (not shown) agitates the conveyor to ensure effective accommodation of tokens within the recesses. The agitation mechanism also causes tokens not accommodated within a recess to drop into a cavity beneath the conveyor 40, wherein a reclaimer (not shown) is positioned and arranged to return non-stacked tokens from beneath the conveyor 40 back to the conveyor 40.

The conveyor 40 carries the gaming tokens 26 toward a sensor (not shown) whereupon the predetermined characteristic of the tokens can be identified. In the embodiment shown, the predetermined characteristic is the colour of the token. Additional embodiments will be appreciated wherein the predetermined characteristic is something other than colour, such as, for example, shape, size, weight, texture, pattern, text or data stored on a memory comprised within the token. In the embodiment shown the sensor comprises an optical detector arrangement for detecting the colour of an edge portion of the token. Tokens of different value i.e. different identities, have different colours and this can be detected by the sensor and the appropriate colour signal passed on to the processor 52. The tokens then pass in the conveyor 40 between the base of the stacks of tokens 26 in the channels 44, below which the sorting mechanism 42 is arranged comprising a linear array of solenoids positioned to transfer the appropriate tokens into the appropriate channels 44.

Tokens are thus conveyed along the conveyor 40 past the sensor and along past the bases of the channels 44 comprising stacks of tokens 26. The sensor identifies the tokens by their colour and the processor 52 receives the colour signals from the sensor in order to control the solenoids in order to insert the tokens into the correct channels 44.

Insertion of tokens into the correct channel 44 involves selectively lifting of the leading edge of the tokens using pins actuated by the solenoids controlled by the processor 52. The pins are arranged beneath the recesses within the conveyor arranged to hold the tokens, positioned toward the leading edge of the recesses in order to lift the leading edge of the tokens. When the solenoids are selectively actuated by the processor, the solenoids are brought into engagement with the pins, and the pins are urged upwards thereby lifting the leading edge of the tokens.

The leading edge of the tokens then comes into contact with a lower ridge within the sorting mechanism 42 beneath the correct channel 44. The ridge is chamfered in order to cause the tokens to be forced onto the bottom of the stack of tokens by the driving force of the conveyor 40. Additional members are provided to restrain the trailing edge of the tokens as a pin lifts up the leading edge. Thus, the token is driven onto the bottom of the stack of tokens 26 extending through a hole in the bar forming the base of the rack. The force of entry of the token into the bottom of the stack is sufficient to raise the stack to accommodate the new token. The speed of the conveyor 40 and sorting mechanism 42 can be modified by the processor 52, and controlled from the display member in order to optimise the stacking of tokens.

In use, the user of the token sorting apparatus according to the embodiment shown is a croupier attending to the gaming table. The token sorting apparatus is arranged to receive information from the automated roulette wheel relating to the stage of the roulette game, and various other operation data associated with the use of the roulette wheel.

Referring to FIG. 3A, an example view of a display member 48 is shown, providing a touch-sensitive screen 50 having a menu region 54, having a plurality of options for control of the token sorting apparatus 26 or roulette wheel 20, performing diagnostic tasks upon the token sorting apparatus 26 or roulette wheel 20, and/or visualising operation data relating to use of the token sorting apparatus 26 or roulette wheel 20. The touch-sensitive screen 50 further provides a control region having an option for alerting a supervisor or the user or viewing an image obtained from the camera 46. FIG. 3B provides an example view of a touch-sensitive screen 50 of a display member 48 of the present invention displaying an image obtained using internal camera 46, the image providing identification of any foreign or rogue objects which may be a hazard to the token sorting apparatus.

The display member 48 provides a clear on-screen menu providing the ability to quickly and easily search for menu items, which may include an interrogation of the token sorting apparatus for operative data relating to the status of the token sorting apparatus; a camera image of the displacement member; the status of the roulette wheel. The display member permits an expandable view, which may omit touch-sensitive controls to provide an expanded view of a displayed item. This provides for more easily viewed menus and provides for making changes quickly and efficiently, limiting the excess time spent traversing menu screens by the dealer.

The camera 46 enables the identification of rogue items within the token sorting apparatus, which may present a hazard to the safe and continued working of the apparatus. Quick and effective identification of such items might remove the need to request maintenance of the apparatus, which might involve a laborious removal of covers and inspection of the displacement member. This may also provide the added benefit of improved security, providing the ability to spot items that may have been deliberately thrown into the token sorting apparatus to cause the opening of the apparatus and potential exposure to token theft. Combined with an expandable view of the display member as previously described, the camera therefore aids in the identification of suspicious or malicious activity.

The display member is further arranged to provide a visualisation of operation data obtained from the token sorting apparatus such as token count, as shown in FIG. 4A, or the roulette wheel such as wheel bias reports as shown in FIG. 4B. Such operation data can include a number of reports relating to an on-board analysis of data obtained from the roulette wheel sensors or the token sorting apparatus sensors. A wheel bias report, as seen in FIG. 4B can enable a dealer, supervisor, apparatus maintenance staff or technicians to view data relating to bias associated with the results of the roulette wheel. The expandable view of the display can aid in identification of individual biased numbers, pockets or drop zones which may highlight the requirement for adjustment or maintenance of the roulette wheel. The ability to view bias reports using the display member removes the requirement for logging into a computer to view information relating to wheel bias. The added speed with which identification of bias can take place also has the potential to improve security, highlighting potential malicious or suspicious activity early.

For embodiments comprising a roulette wheel having an inbuilt inclinometer, measurements, reports and recorded information can be viewed on the display member of the present invention as shown in FIG. 5, providing early indication of misalignment of the roulette wheel, which can be an additional source of bias.

In some embodiments, the camera is a wide-angle, panoramic or 360 degree camera enabling maximum viewing with minimum need for adjustment of the camera orientation.

It will be appreciated that the above described embodiments are given by way of example only and that various modifications may be made to the described embodiments without departing from the scope of the invention as defined in the appended claims, for example embodiments will be apparent wherein the signalling member performs additional displays of illumination, such as for example a countdown to signify the start of a particular game stage, such as when to spin a roulette wheel ball. The countdown may comprise the sequential illumination of individual segments of the signalling member 30, such as segments of the ring surrounding the entry aperture 28. A benefit of this feature would include the removal any additional indicators, such as a dealer console, from the gaming table.

An indication of the correct game stage using a token sorting apparatus of the present invention preferably aids dealer and croupier optimisation, improving accuracy and speed with which a game is managed. An example would be an indication to the croupier or dealer, by providing a separate signal from signalling member at stages where gaming tokens, such as chips, are counted compared to at those stages when the tokens are not to be counted. An example of such a situation would include when paying rewards to winners on a gaming table. In such situations, there are often additional tokens from those used to pay winnings, which get discarded and these should not be counted toward the tokens contributed by players. Other instances wherein tokens might be discarded include cut stack tokens. In sets of 35 tokens, there may be 5 tokens from every cut stack that are discarded. Unused and discarded tokens such as these might be assigned a status, such as, for example 'discarded tokens', 'unused tokens' or 'player abandoned tokens'. These discarded tokens might be of no interest for monitoring, statistics or data analysis and if so would not be included in the tokens counted or analysed from the game. The signal from the signalling member might highlight this to the dealer.

An additional indication from the signal of the signalling member might include to provide an alert, a warning or casino status information. Such alerts might be used for example to show if any local or remote electronic terminals or devices are currently engaged to play at the gaming table. This would beneficially indicate to a dealer or croupier whether it is necessary to spin the roulette wheel, even when there are no local players positioned at the table.

Additional examples include the provision of information or alerts from a casino management network or system, which may indicate that a filling or credit of a token sorting machine will occur imminently. Such an indication would highlight to a dealer to alert players that operation of the table will temporarily cease following the next game.

Additional signals might include an indication of the number of games left until the gaming table or token sorting machine is to cease operation. Such a signal might highlight to the dealer or croupier that there are only, for example, 3 spins of the roulette wheel left in which to count gaming tokens and close down the gaming table.

Further alternatives might include an indication of the number of games left until a global update occurs, such as for example a minimum or maximum wager value changes. A dealer or croupier may need be aware of changes to minimum or maximum wager values so that players may be warned, and also to cash in all players and have the players buy in at the new value where required.

Additional uses of the signalling member might include to indicate to the dealer or croupier that there has been a token jam or issues with the token sorting machine.

Additional examples of signals provided by the signalling member might include an indication of the orientation of the roulette wheel. Such an indication might be obtained from an integrated inclinometer within the roulette wheel, and would be useful to indicate to the dealer or croupier of whether the orientation of the roulette wheel has changed, which may affect biasing within the roulette wheel.

A signalling member may also be used to provide an indication of the speed of the rotor of the roulette wheel, or the speed of the ball within the wheel. Using the described embodiment as an example, such an indication may be given by illuminating a portion of the signalling member around the periphery of the entry aperture relative to the speed. Such a signal may take into account a "speed profile" for a particular dealer, determined according to previous performance of said dealer. The speed profile of said dealer could be then used to determine a minimum and maximum ball and rotor speed for said dealer, with the indication of said speed using the signalling member providing an indication as the quality of the dealer performance. Such an indication might be used for optimisation of dealer performance.

In the embodiments described, the signalling member takes the form of an illuminated ring around an entry aperture. Additional embodiments will be conceivable wherein the signalling member takes the form of any device suitable for transmitting information to a dealer or croupier. The signalling member may provide a visible, legible or audible signal, or any combination thereof suitable for transmitting information to a dealer or croupier.

The invention claimed is:

1. A token sorting apparatus arranged to supplement a game using gaming tokens, the game having a plurality of stages, the token sorting apparatus comprising:
   an entry aperture arranged to accept gaming tokens into an internal cavity;
   a sorting mechanism arranged to sort the gaming tokens according to a predetermined characteristic of the gaming tokens;
   a displacement member positioned within the internal cavity and arranged to urge the gaming tokens accepted by the entry aperture to the sorting mechanism;
   a camera positioned within the internal cavity and arranged to obtain an image of the sorting mechanism and the displacement member;
   a display member in digital communication with the camera, the display member arranged to display the image to a user; and
   a signalling member arranged to provide a signal to the user, the signal being arranged to indicate a stage of the game or a status of the game.

2. The token sorting apparatus of claim 1, wherein the signal is further arranged to indicate a status of the token sorting apparatus.

3. The token sorting apparatus of claim 1, wherein the signalling member comprises at least one illumination member.

4. The token sorting apparatus of claim 1, wherein the signal comprises a display of illumination.

5. The token sorting apparatus of claim 4, wherein the display of illumination comprises a sequence of illumination.

6. The token sorting apparatus of claim 4, wherein the display of illumination is arranged to be customised according to a predetermined list of game stages.

7. The token sorting apparatus of claim 1, wherein the signalling member is located about a circumference of the entry aperture.

8. The token sorting apparatus of claim 1, wherein the gaming tokens comprise gaming chips.

9. The token sorting apparatus of claim 1, wherein the predetermined characteristic comprises one of: a colour; an opacity; a size; a shape; a density; a mass; a weight; an indentation; an engraving; an embossment; a surface marking; a surface number; a surface image; a surface indicia; a surface pattern; or a data value stored on the token.

10. The token sorting apparatus of claim 1, wherein the sorting mechanism is further arranged to present sorted tokens to the user.

11. The token sorting apparatus of claim 1, wherein the token sorting apparatus further comprises at least one sensor arranged to obtain first operation data relating to an operation of the token sorting apparatus.

12. The token sorting apparatus of claim 11, wherein the token sorting apparatus is arranged to record and store the first operation data.

13. The token sorting apparatus of claim 12, wherein the first operation data comprises at least one of: a status of the token sorting apparatus; a sum of the gaming tokens; a duration of the game; or a duration of a game stage.

14. The token sorting apparatus of claim 13, wherein the token sorting apparatus is arranged to communicate the stored operation data to a server.

15. The token sorting apparatus of claim 1, wherein the token sorting apparatus is arranged to communicate with at least one physical random number generator, the physical random number generator used to play the game.

16. The token sorting apparatus of claim 15, wherein the physical random number generator comprises at least one physical random number generator sensor arranged to detect operation data, the operation data relating to the operation of the physical random number generator.

17. The token sorting apparatus of claim 16, wherein the token sorting apparatus is further arranged to receive the operation data from the physical random number generator sensor.

18. The token sorting apparatus of claim 17, wherein the token sorting apparatus is arranged to record and store the operation data.

19. The token sorting apparatus of claim 16, wherein the operation data comprises at least one of: a stage of the game; a status of the game; a start of the game; an end of the game; a duration of the game; a start of a game stage; an end of the game stage; a duration of the game stage; a result of the game; a zone bias; a number bias; or a physical orientation of the physical random number generator.

* * * * *